(12) United States Patent
Reiley et al.

(10) Patent No.: US 10,818,188 B2
(45) Date of Patent: Oct. 27, 2020

(54) METHOD FOR DISPATCHING A VEHICLE TO A USER'S LOCATION

(71) Applicant: Direct Current Capital LLC, Wilmington, DE (US)

(72) Inventors: Carol Reiley, Mountain View, CA (US); Fabien Blanc-Paques, Mountain View, CA (US)

(*) Notice: Subject to any disclaimer, the term of this patent is extended or adjusted under 35 U.S.C. 154(b) by 0 days.

(21) Appl. No.: 15/840,506

(22) Filed: Dec. 13, 2017

(65) Prior Publication Data

US 2018/0357907 A1 Dec. 13, 2018

Related U.S. Application Data

(60) Provisional application No. 62/433,714, filed on Dec. 13, 2016.

(51) Int. Cl.
| | | |
|---|---|---|
| G08G 1/00 | (2006.01) |
| G08G 1/005 | (2006.01) |
| H04W 4/02 | (2018.01) |
| H04W 4/44 | (2018.01) |
| G06K 9/00 | (2006.01) |

(52) U.S. Cl.
CPC ......... G08G 1/202 (2013.01); G06K 9/00664 (2013.01); G08G 1/005 (2013.01); H04W 4/023 (2013.01); H04W 4/44 (2018.02)

(58) Field of Classification Search
CPC ........ G08G 1/202; H04W 4/44; H04W 4/023; G06K 9/00664
USPC .......................................................... 701/454
See application file for complete search history.

(56) References Cited

U.S. PATENT DOCUMENTS

| | | | |
|---|---|---|---|
| 10,354,232 B2* | 7/2019 | Tomlin, Jr. ............. | G06Q 10/30 |
| 2003/0209893 A1 | 11/2003 | Breed et al. | |
| 2006/0244830 A1* | 11/2006 | Davenport ............ | B61L 25/021 |
| | | | 348/148 |
| 2007/0262574 A1 | 11/2007 | Breed et al. | |
| 2011/0275408 A1* | 11/2011 | Kulik ..................... | G01C 17/34 |
| | | | 455/556.1 |
| 2012/0042036 A1* | 2/2012 | Lau ........................ | H04W 4/60 |
| | | | 709/217 |

(Continued)

OTHER PUBLICATIONS

Song, Wei, U.S. Appl. No. 16/049,761, filed Jul. 30, 2018.
Song, Wei, U.S. Appl. No. 16/049,762, filed Jul. 30, 2018.

Primary Examiner — Marthe Y Marc-Coleman
(74) Attorney, Agent, or Firm — Polsinelli PC (57) ABSTRACT

One variation of a method for determining a location of a user includes: at a mobile computing device, receiving from the user a request for pickup by a road vehicle; accessing an optical image recorded by the mobile computing device at approximately the first time; detecting a set of image features in the optical image; accessing an approximate location of the mobile computing device from a geospatial positioning system; accessing a set of known features associated with geographic locations within a threshold distance of the approximate location; in response to detecting correspondence between a first image feature in the set of image features and a first known feature in the set of known features, extrapolating an action geographic location of the mobile computing device based on a particular geographic location associated with the particular known feature; and dispatching an autonomous vehicle to proximal the actual geographic location.

19 Claims, 3 Drawing Sheets

(56) References Cited

U.S. PATENT DOCUMENTS

| | | | |
|---|---|---|---|
| 2012/0126000 A1 | 5/2012 | Kunzig et al. | |
| 2012/0321175 A1* | 12/2012 | Hedau | G06K 9/6227 |
| | | | 382/159 |
| 2013/0190981 A1 | 7/2013 | Dolinar et al. | |
| 2013/0222525 A1* | 8/2013 | Forghieri | G06Q 10/06 |
| | | | 348/14.08 |
| 2014/0016821 A1* | 1/2014 | Arth | G06K 9/00671 |
| | | | 382/103 |
| 2015/0350378 A1* | 12/2015 | Hertel | H04L 67/42 |
| | | | 709/203 |
| 2015/0350846 A1* | 12/2015 | Chen | G01C 21/206 |
| | | | 455/456.1 |
| 2016/0182971 A1* | 6/2016 | Ortiz | H04N 21/8133 |
| | | | 725/34 |
| 2016/0292507 A1* | 10/2016 | Ghoson | G06K 9/00671 |
| 2016/0373922 A1* | 12/2016 | Shanmugam | H04W 8/24 |
| 2017/0178269 A1* | 6/2017 | McKinnon | G06Q 50/30 |
| 2017/0166222 A1 | 7/2017 | James | |
| 2018/0039276 A1* | 2/2018 | Keivan | G05D 1/0246 |
| 2018/0285659 A1 | 10/2018 | Kwant et al. | |
| 2018/0300564 A1 | 10/2018 | Kwant et al. | |
| 2018/0373941 A1 | 12/2018 | Kwant et al. | |
| 2019/0034694 A1 | 1/2019 | Ross | |
| 2019/0034740 A1 | 1/2019 | Kwant et al. | |
| 2019/0035101 A1 | 1/2019 | Kwant et al. | |
| 2019/0137290 A1 | 5/2019 | Levy et al. | |

\* cited by examiner

METHOD FOR DISPATCHING A VEHICLE TO A USER'S LOCATION

CROSS-REFERENCE TO RELATED APPLICATIONS

This Application claims the benefit of U.S. Provisional Application No. 62/433,714, filed on 13 Dec. 2016, which is incorporated in its entirety by this reference.

TECHNICAL FIELD

This invention relates generally to the field of human-to-vehicle communications and more specifically to a new and useful method for dispatching a vehicle to a user's location in the field of human-to-vehicle communications.

SUMMARY

Implementations described and claimed herein provide systems and methods for localizing a user. In one implementation, a request for pickup of the user by a road vehicle is received. The request is captured with a mobile computing device. An optical image recorded by the mobile computing device at a first time is accessed. The optical image is accessed in connection with a notification served to the user through the mobile computing device to manually record the optical image in response to receiving the request for pickup of the user. A set of image features represented by the optical image is detected. An approximate location of the mobile computing device is accessed from a geospatial positioning system. A set of known features is scanned for correspondence to one or more image features in the set of image features. The set of known features is associated with one or more geographic locations within a threshold distance of the approximate location. In response to detecting a correspondence between a first image feature in the set of image features and a first known feature in the set of known features, an actual geographic location of the mobile computing device is calculated based on a first geographic location associated with the first known feature. An autonomous vehicle is dispatched to proximal the actual geographic location.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
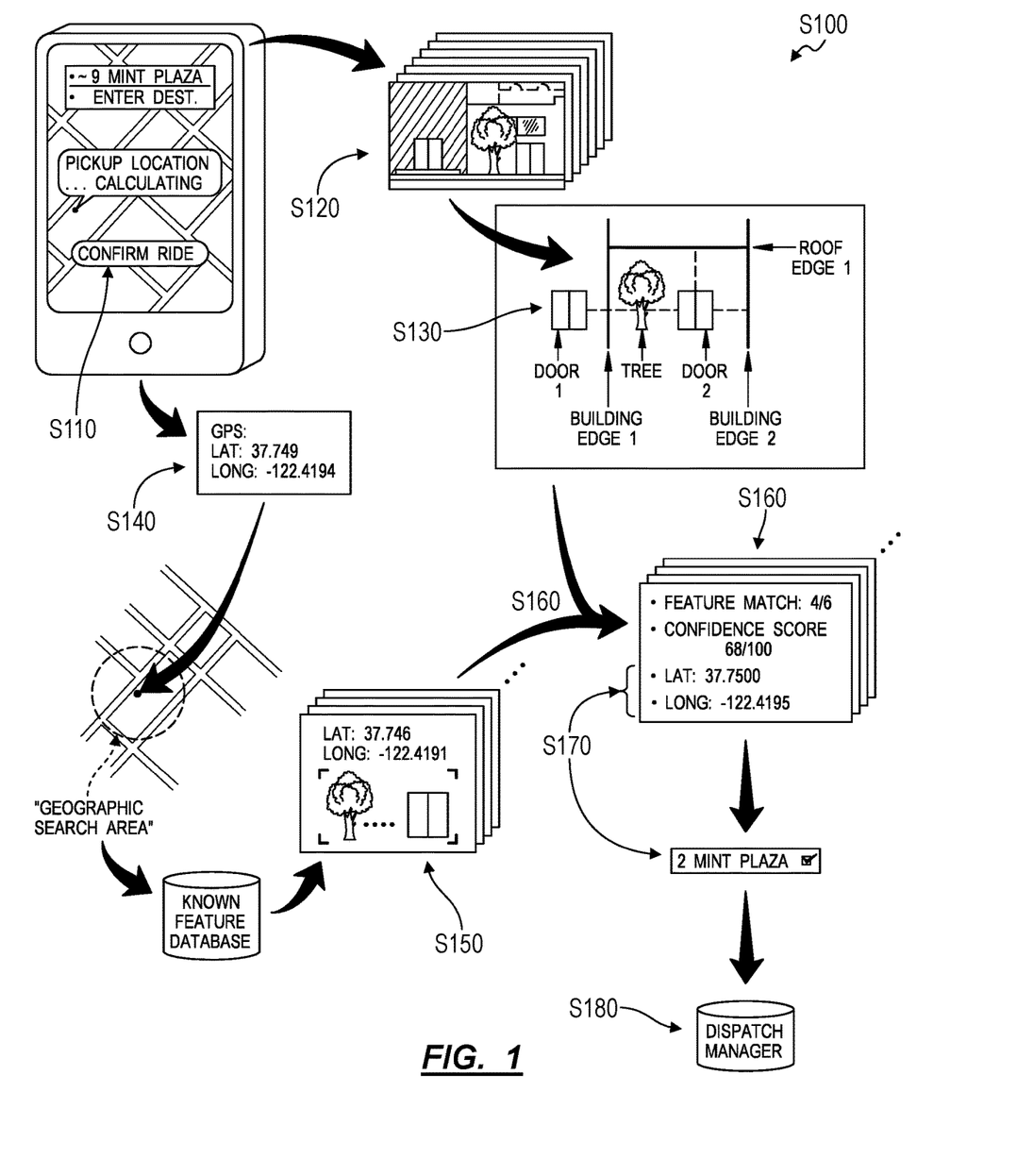
FIG. 1 is a flowchart representation of a method.
Figure 2:
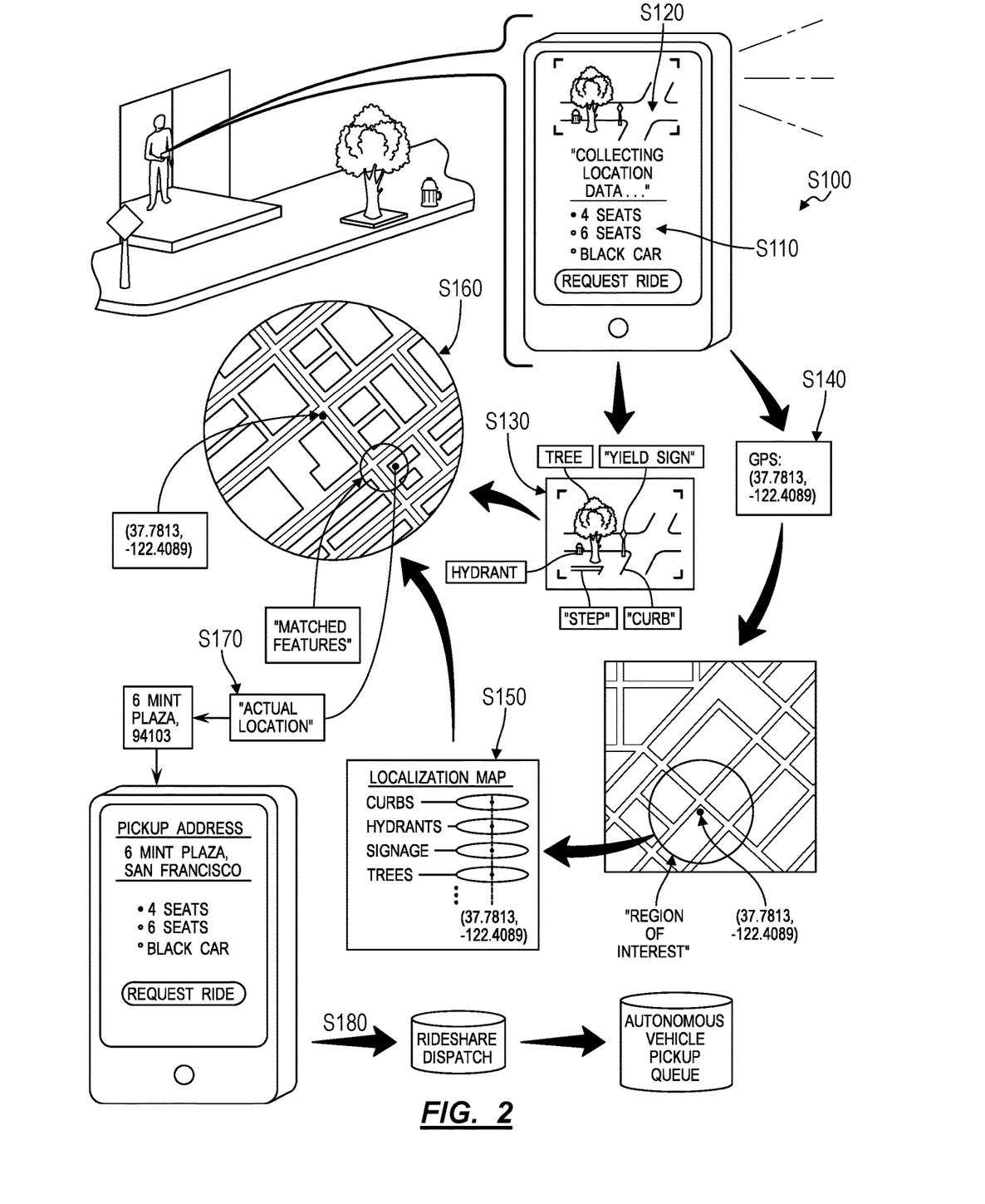
FIGS. 2 and 3 are each a flowchart representation of one variation of the method.

As shown in FIGS. 1 and 2, a method S100 for localizing a user includes: at a mobile computing device, receiving from the user a request for pickup by a road vehicle in Block S110; accessing an optical image recorded by the mobile computing device at approximately the first time in Block S120; detecting a set of image features represented by the optical image in Block S130; accessing an approximate location of the mobile computing device from a geospatial positioning system in Block S140; scanning a set of known features for correspondence to image features in the set of image features in Block S160, the set of known features associated with geographic locations within a threshold distance of the approximate location; in response to detecting correspondence between a first image feature in the set of image features and a first known feature in the set of known features, calculating an actual geographic location of the mobile computing device based on a first geographic location associated with the first known feature in Block S170; and dispatching an autonomous vehicle to proximal the actual geographic location in Block S180.

Figure 3:
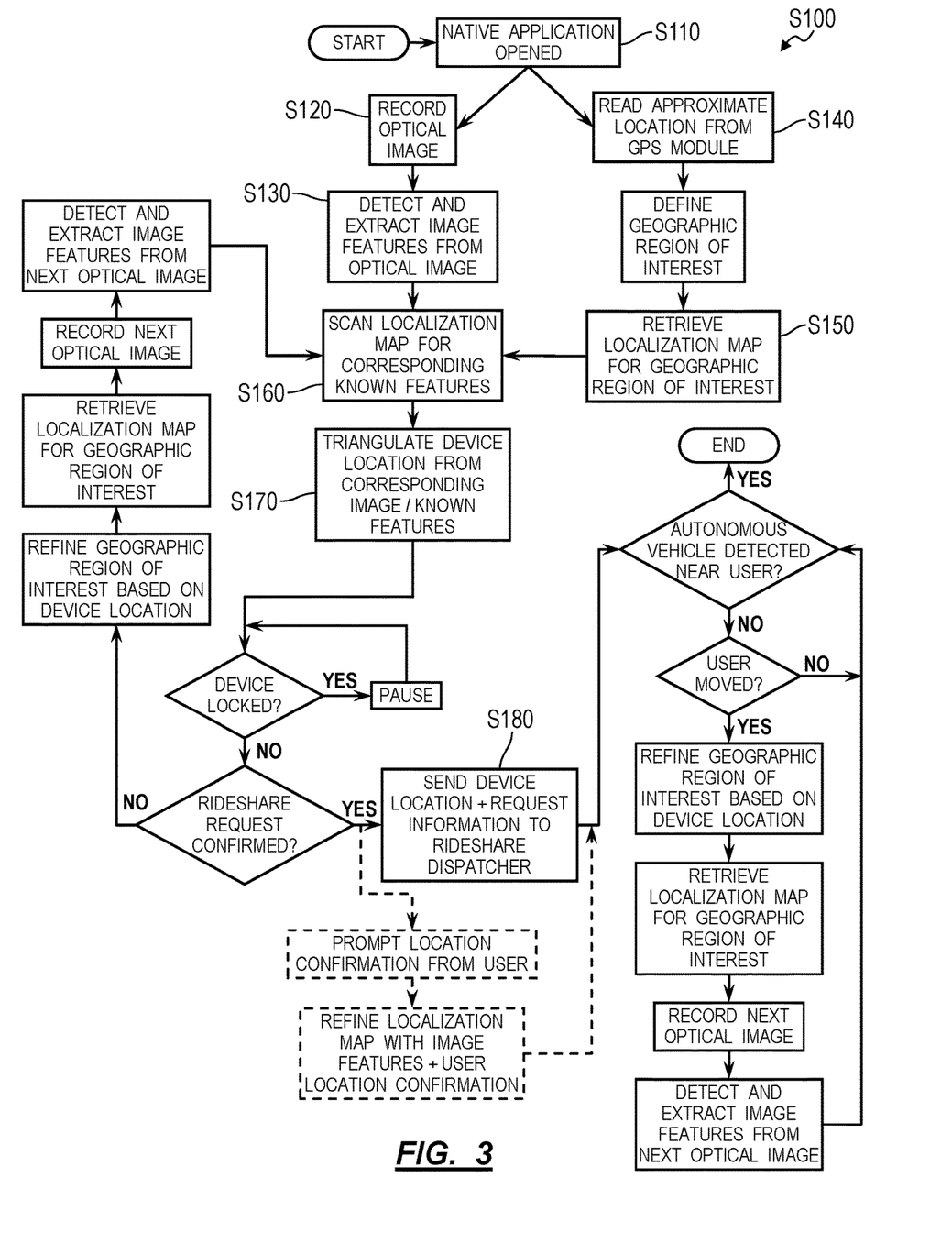

As shown in FIG. 3, one variation of the method S100 includes: at a mobile computing device, receiving from the user a request for pickup by a road vehicle in Block S110; accessing an optical image recorded by the mobile computing device at approximately the first time in Block S120; detecting a set of image features in the optical image in Block S130; accessing an approximate location of the mobile computing device from a geospatial positioning system in Block S140; accessing a set of known features associated with geographic locations within a threshold distance of the approximate location in Block S150; in response to detecting correspondence between a first image feature in the set of image features and a first known feature in the set of known features, extrapolating an action geographic location of the mobile computing device based on a particular geographic location associated with the particular known feature in Block S170; and dispatching an autonomous vehicle to proximal the actual geographic location in Block S180.

2. Applications

Generally, a native application executing on a user's mobile computing device (e.g., a smartphone, a tablet, a smart watch, a laptop computer) can execute Blocks of the method S100 to: receive a pickup request from a user; collect optical data—such as digital photographic images, a color video feed, depth maps, etc.—from its local environment; to match these optical data to a geographic location; and to dispatch a vehicle (e.g., an autonomous vehicle) to this geographic location to collect the user. In particular, though the mobile computing device may include a geographic location sensor configured to determine an approximate location of the mobile computing device (e.g., a geospatial positioning system, or "GPS" module configured to communicate with external devices, such as satellites, to determine its location within a geospatial coordinate system), this geographic location sensor may output approximate locations that are limited in their accuracy, repeatability, and resolution in some scenarios. For example, the precision of the geographic location sensor may be limited when the mobile computing device is located inside a building or occupying an outdoor space near a large building. In this example, a location output by a geographic location sensor in the mobile computing device may be offset from a true location of the mobile computing device due to presence of tall structures that reflect and/or attenuate satellite signals detected by the geographic location sensor; because the geographic location sensor may transform these satellite signals into an estimate of its location, such local reflection and/or attenuation of these signals may cause the geographic location sensor to output an approximate location that differs by hundreds of meters or even several city block.

The native application can therefore execute Blocks of the method S100 to more accurately and repeatably determine a geographic location of the mobile computing device by matching optical data collected through a sensor (e.g., a color camera) integrated into the mobile computing device to geographically-labeled template data representing indoor and/or outdoor spaces within a geographic region. By thus collecting and processing optical data to localize the mobile computing device accordingly to Blocks of the method S100, the mobile computing device can: achieve relatively precise calculation of its geographic location, regardless of whether the mobile computing device is occupying an indoor or outdoor space; and then dispatch an autonomous vehicle—such as an autonomous rideshare vehicle or an autonomous vehicle owned by the user—to this geographic location or to a road surface nearby.

Blocks of the method S100 can therefore be executed by an instance of a native application executing on a user's mobile computing device (e.g., smartphone, tablet, etc.) in order to automatically determine the user's location with a high degree of accuracy based on optical data collected at the mobile computing device. This location can then be served to an autonomous vehicle (i.e., a vehicle that generally performs navigational actions with local or remote human input, such as through a remote rideshare dispatcher) to enable the autonomous vehicle to reach the user without additional intervention by the user or by a manager of the autonomous vehicle. In particular, because the autonomous vehicle may not support a phone call from the user and interpretation of the user's oral description of her current surroundings in order to direct the autonomous vehicle to her location, the native application can execute Blocks of the method S100 in order to automatically determine the user's location from optical data collected by the user's mobile computing device rather than through a geographic location sensor, as the former may yield greater locational accuracy and repeatability than the latter.

Blocks of the method S100 as described herein are executed locally on a mobile computing device by a native application in order to accurately determine the user's location, which an autonomous rideshare, taxi, or ground-transport vehicle can then implement to navigate to a paved location nearest the user. However, Blocks of the method S100 can additionally or alternatively be executed by a remote computer system, such as a remote server or computer network, to determine the user's location in preparation for pickup of the user, pickup of goods or packages from the user, and/or delivery of goods or packages to the user, etc. For example, the native application can function to receive rideshare request information from a user, to collect optical data through a camera or other optical sensor integrated into the mobile computing device, to prompt feedback from the user, and to return these data to the remote computer system; and the remote computer system can remotely process these data to determine the actual current location of the mobile computing device and to refine or update a localization map or other geo-referenced model based on these data. Furthermore, the method S100 can be executed to provide more accurate destination data for manually-operated road vehicles.

3. Rideshare Example

In one example shown in FIGS. 1 and 2, the native application (and/or a remote computer system) executes Blocks of the method S100 in conjunction with rideshare request functionality to access an approximate location of the mobile computing device from a geographic location sensor (e.g., a GPS sensor) in the mobile computing device and to opportunistically record optical data (e.g., a single photographic image or a video feed) as a user enters various rideshare request information, such as vehicle size and destination. In particular, rather than request that the user enter a pickup location, place a pin at her current location in a geographic map, or record an image or video of her current location, the native application can automatically record an image or video through one or more cameras integrated into the mobile computing device once the user has opened the native application and prepares to enter rideshare request information.

The native application can then: detect features (e.g., text, edges, and/or objects, etc.) in the optical data; define a geographic region of interest near (e.g., within a 400-meter radius of) the GPS-based approximate location of the mobile computing device; and scan a segment of a localization map—containing representations of interior spaces and/or exterior surfaces within this geographic region of interest—for similarities to features detected in the optical data. In this example, the localization map can contain geo-referenced template images of: an interior space of a public or private building; a building entry point; a courtyard; a street; an alley; an intersection; a parking garage; a park or green space; or a beach or other outdoor space; etc. Alternatively, the localization map can include a 3D model or 2D height map containing geospatially-label points or other features and constructed from depth (e.g., LIDAR) or color images of interior and/or exterior spaces within the geographic region. As the native application (and/or the remote computer system) converges on a particular geographic location within the localization map that represents known features exhibiting high correspondence—such as in both feature types, geometries, and relative feature positions—to features detected in the optical data, the native application can extrapolate the actual geographic location of the mobile computing device, such as in the form of an address, green space, building name, building access point, or intersection, etc. Furthermore, if the native application determines that the user is occupying an indoor or outdoor space with limited exits, the native application can identify the space, identify an exit nearest the user (or most convenient for the autonomous vehicle to meet the user), direct the autonomous vehicle to this exit, and similarly prompt the user to navigate to this exit.

The native application (and/or the remote computer system) can perform the foregoing methods and techniques to determine the location of the user from optical data collected opportunistically once the user opens the native application and then dispatch an autonomous rideshare vehicle to (or near) the user's location to collect the user once the user confirms the rideshare request within the native application.

The native application can also regularly repeat Blocks of the method S100 to collect optical data at the mobile computing device, transform these optical data into a location of the mobile computing device, and automatically update the assigned destination of the autonomous vehicle as the user waits for the autonomous vehicle. For example, as the user inputs various rideshare request information into the native application, confirms a rideshare request at the autonomous vehicle, and navigates throughout native applications executing on the mobile computing device, the native application can: continue to opportunistically collect images through the mobile computing device's camera(s), such as once per second; record an orientation (e.g., pitch, yaw, roll, and compass heading) of the mobile computing device when these images are captured; stitch these images into a larger composite 2D image or 3D point cloud based on orientations of the mobile computing device when these images were captured; extract a more distinct constellation of 2D or 3D features from this composite 2D image or 3D point cloud; and refine the determined location of the mobile computing device based on a comparison of this revised constellation of 2D or 3D features to the localization. The native application can implement similar methods and techniques to revise the determined location of the mobile computing device when the native application has determined that user is walking or has otherwise moved (e.g., by more than a threshold distance) since the location of the mobile computing device was last determined in order to update the destination assigned to the autonomous vehicle dispatched to collect the user.

In the foregoing example, once the user has entered a pickup request into the autonomous vehicle, the native application can additionally or alternatively prompt the user to record a static image or video of her environment (e.g., a distinguishing feature in her proximity, such as a building entrance, a building façade, a billboard, a street sign, etc.) with the mobile computing device. The native application can then implement the foregoing methods and techniques to transform this static image or video into a location of the mobile computing device and to dispatch an autonomous vehicle to this location accordingly.

4. Request

Block S110 of the method S100 recites, at a mobile computing device, receiving from a user a request for pickup by a road vehicle. Generally, in Block S110, the native application executing on the user's mobile computing device receives a request for a rideshare, taxi, or other ground-transport service to collect (i.e., "pick up") the user from her current location. For example, the user can navigate to the native application from a home screen on her mobile computing device and then request a type of ground transportation (e.g., a vehicle size), enter a destination, select a payment option, and then confirm the rideshare request within the native application, such as shown in FIG. 2. As the user supplies these data in Block S110, the native application can opportunistically record optical data (e.g., static images or a video) through one or more optical sensors (e.g., a forward-facing and/or a rear-facing color camera) in the mobile computing device, as shown in FIG. 3. The native application can additionally or alternatively collect optical data through the optical sensor(s) in Block S120 once the user has confirmed the rideshare request.

5. Automated Scan

Block S120 of the method S100 recites retrieving a photographic image recorded by the mobile computing device at approximately the first time. Generally, the native application collects optical data from the user's environment in Block S120; the native application then processes these optical data in Blocks S130 and S160 to determine the location of the user's mobile computing device.

5.1 Opportunistic Data Collection

In one implementation, the native application collects optical data opportunistically—that is, without explicit manual input or direct manual control—in Block S120. For example, the native application can automatically trigger the mobile computing device to record a color photographic image or a color video: in response to initiation of the native application at the mobile computing device and before confirmation a rideshare request from the user; or in response to receiving confirmation of the request from the user.

In this implementation, the native application passively collects optical data (e.g., digital photographic images, a digital color video feed) through a forward-facing camera and/or a rear-facing camera integrated into the mobile computing device. For example, the native application can implement various rules described below to trigger: recordation of a video through an integrated forward-facing camera at a rate of 24 Hz; or automatically focus both forward- and rear-facing cameras in the mobile computing device and trigger recordation of a sequence of digital photographic images at a rate of 1 Hz through both the forward- and rear-facing cameras.

In this implementation, the native application can therefore execute various rules for opportunistically (e.g., passively) collecting optical data. For example, the native application can begin to record discrete photographic images or a video in response to one or more of: the user opening the native application; the user selecting a ground transportation type; the user entering a destination; the user confirming a ride request within the native application; and/or the user orienting the mobile computing device such that the optical axis of the forward-facing camera falls within 30° of horizontal. For example, the native application can: initiate recordation of a first video through the forward-facing camera once the user opens the native application or confirms the rideshare request at a first time; cease recordation of the video in response to the mobile computing device entering a locked-screen mode (e.g., in response to the user locking the mobile computing device) at a second, subsequent time; and then automatically initiate recordation of a second color video (or automatically resume recordation of the first video) once the mobile computing device resumes operation (i.e., exits the locked-screen mode) at a third, subsequent time.

In the foregoing implementation, the native application can: continue to opportunistically record optical data when the mobile computing device is in use (and when other rules are met, such as relating to orientation of the mobile computing device) in Block S120 and process these optical data to determine the location of the mobile computing device, as described below; and then cease opportunistic recordation of optical data in response to other trigger events. For example, the native application can cease recordation of the second color video in response to detecting proximity of the mobile computing device to the autonomous vehicle. In this example, the native application (or the remote computer system) can implement methods and techniques described below to: detect a set of image features represented by an optical image recorded by the native application; receive an optical data from the autonomous vehicle as the autonomous vehicle autonomously navigates toward its assigned location near the user; scan the autonomous vehicle optical data for features exhibiting correspondence to image features extracted from the optical image recorded by the mobile computing device; and then cease further opportunistic recordation of optical data at the mobile computing device in response to detecting a feature in the autonomous vehicle optical data that exhibits correspondence to an image feature detected in the optical data recorded by the mobile computing device, since such correspondence may indicate proximity of the autonomous vehicle to the mobile computing device. In particular, the native application can cease further opportunistic recordation of optical data if like features in optical data recently recorded by the mobile computing device exhibit correspondence to features in optical data recently recorded by the autonomous vehicle, which may indicate that the user and the autonomous vehicle are occupying the same or nearby locations, as shown in FIG. 3. In another example, the native application can cease opportunistic recordation of optical data once the native application converges on the location of the mobile computing device and resume opportunistic recordation of optical data in response to detecting motion of the mobile computing device, such as detecting that the pedestrian has taken more than ten steps. In yet another example, the native application can cease opportunistic recordation of optical data once a physical or wireless handshake between the mobile computing device and the autonomous vehicle is detected.

5.2 Guided Data Collection

In another variation, the native application prompts the user to capture one or more digital photographic images, digital photographic panoramic images, or videos and then implements methods and techniques described above to transform features in this optical image(s) into a location of the user's mobile computing device.

In one implementation, once the user confirms the rideshare request within the native application, the native application prompts the user to capture a photographic image— through a camera integrated into the mobile computing device—of a distinguishing (e.g., "interesting") immutable (i.e., generally unchanging, fixed) object, building, text string, icon, logo, advertisement, branding content, art installation, road sign, interior space, floor, building entrance or exit, etc. near the user. For example, in response to receiving the request from the user, the native application can serve a notification to the user through the mobile computing device to manually record the optical image, wherein the notification includes a prompt to manually scan a distinguishing immutable feature in a scene near the user with an optical sensor integrated into the mobile computing device. Once the optical image is thus recorded, the native application can also: render the optical image on the display of the mobile computing device; prompt the user to manually circle, highlight, or otherwise indicate one or more distinguishing immutable objects captured in the optical image; selectively extract features representing these indicated objects from the optical image in Block S130; and selectively match these extracted features to known georeferenced features in the localization map to determine the mobile computing device's location in Block S160.

In another example, the native application prompts the user to scan her mobile computing device horizontally to capture a 90°, 180°, 270°, of 360° horizontal panoramic image of her surroundings; the native application then extracts features from this horizontal panoramic image and processes this horizontal panoramic image as described above. Furthermore, in this example, the native application can process sections of the horizontal panoramic image substantially in real-time during recordation of the horizontal panoramic image and cease capture of the horizontal panoramic image once a geographic location with a sufficient confidence score is calculated.

In a similar example, the native application can prompt the user to record a semispherical (e.g., approximately hemispherical) scan of her environment in Block S120. In this example, the native application can: track the location and orientation of the mobile computing device during this scan—such as based on outputs of an accelerometer and/or gyroscope integrated into the mobile computing device; stitch discrete images recorded during this scan into a 3D semispherical image; extract features from this 3D semispherical image; and implement methods and techniques described above to predict a geographic location of the user's mobile computing device based on matches between these image features and known features or template images associated with particular geographic locations.

However, in Block S120, the native application can implement any other methods or techniques to opportunistically collect optical data or to guide the user in recording useful optical data that the native application can then transform into a location of the mobile computing device. The native application can then store these video frames or photographic images (hereinafter "optical images") locally on the mobile computing device for local processing in Blocks S130 and S160.

(Alternatively the native application can upload these optical images or constellations of features extracted from these optical images to a remote computer system for remote processing in (near) real-time, as described below. Similarly, the remote computer system can additionally or alternatively interface with the native application to remotely execute any one or more of the foregoing processes in Block S120.)

6. Approximate Location

Block S140 of the method S100 recites accessing an approximate location detected by a geographic location module integrated into the mobile computing device; and Block S150 of the method S100 recites retrieving a set of known features labeled with geographic locations within a threshold distance of the approximate location. Generally, the native application (or the remote computer system): approximates the location of the user's mobile computing device in Block S140 based on an output of a geographic location module; and retrieves known features labeled within locations near the mobile computing device's approximate location in Block S150.

In one implementation, the native application: calls a geographic location sensor (e.g., a GPS sensor) integrated into the mobile computing device to return an approximate geographic location of the mobile computing device; and defines a geographic area containing the approximate geographic location of the mobile computing device, such as a geographic area of interest within a 0.25-mile radius of the approximate geographic location returned by the geographic location sensor, as shown in FIGS. 1 and 2. The native application can then access a small portion of a localization map that contains representations of roads, walkways, building exteriors, and/or interior spaces, objects in public and/or private buildings, etc. throughout the geographic area of interest. For example, the localization map can include one or more layers, wherein each layer including a 3D point cloud or 2D height map contains a set of points representing a particular type of feature (e.g., a building façade, a road, a sidewalk, an interior floor, or a road or street sign, etc.) located between a ground plane and a maximum height (e.g., five meters) above the ground plane, wherein each point or cluster of points is associated with a geographic (e.g., GPS) location. Therefore, in this implementation, the native application or the remote computer system can maintain a localization map containing a corpus of known features representing a geographic region. In Block S150, the native application can: define a subregion—within the geographic region—containing and extending radially from the approximate location—output by the GPS module—by a threshold distance that is a function of (e.g., equal to) a locational tolerance of the GPS module; and retrieve an area of the localization map containing points representing objects within this geographic subregion, query this area of the localization map for representative features, or otherwise selectively access this area of the localization map.

Alternatively, in Block S150, the native application can access: a 2D plan map of this geographic area of interest; a set of 2D or 3D template images (e.g., of buildings and streets) geospatially representing known locations within the geographic area of interest; or a 3D color point cloud spanning the geographic area of interest; etc. For example, the native application can pass a geospatial coordinate output by the geographic location sensor to the remote computer system, which can: calculate the geographic area of interest; extract a segment of a 2D map, a segment of a 3D map, a set of known geo-referenced features, and/or a set of geo-referenced template images representing interior and/or exterior spaces within this geographic area of interest; and then return these geo-referenced data to the user's mobile computing device for local processing at the native application in Blocks S150 and S160.

In the foregoing implementations, the autonomous vehicle can initially: calculate a large area of interest according to an initial threshold distance; access a low-resolution area of the localization map corresponding to this large area of interest; and implement methods and techniques described below to calculate an initial revised location of the mobile computing device based on corresponding (e.g., matching, like) features detected in initial optical data recorded in Block S120 and this low-resolution area of the localization map. The native application can then: calculate a smaller geographic area of interest centered around the initial revised location; access a higher-resolution area of the localization map corresponding to this smaller area of interest; implement methods and techniques described below to calculate a second revised location of the mobile computing device based on corresponding (e.g., matching, like) higher-resolution features detected in optical data recorded in Block S120 and this higher-resolution area of the localization map; and repeat this process to compare higher-resolution optical data until the native application converges on a particular location of the mobile computing device.

In another implementation, the native application can: define a relatively small geographic area of interest around the approximate (i.e., GPS-based) geographic location of the user's mobile computing device, such as 0.1-mile boundary; retrieve a subregion of the localization map, known features, or template images corresponding to this small geographic area of interest; execute Blocks of the method S100 described below to determine match features extracted from optical data recorded in Block S120 to known, geo-referenced features; and then expand the geographic area of interest (e.g., in 0.1-mile radius increments) and repeat this process until a match between features extracted from the optical data and known, geo-referenced features is found. The native application (or the remote computer system) can thus limit comparison of optical data collected in Block S120 to known features within a small geographic area of interest to determine the mobile computing device's location and only expand the geographic area of interest if the native application (or the remote computer system) fails to match these optical data to known features within this small geographic area of interest, thereby limiting a volume of known features that the native application scans against features extracted from the new optical data, limiting a volume of data uploaded to the mobile computing device in preparation for executing this comparison, and/or otherwise reducing a time and processing power to transform these new optical data into a location of the mobile computing device.

In this implementation, each known feature and/or each template image can be associated with a known geographic location, such as a known street address, a known building name or number, a known building exit, a known parking lot or road near an outdoor green space, etc. For example, such geospatial data can be stored in metadata with each known visual feature or template image.

However, the native application (and/or the remote computer system) can implement any other method or technique to access an approximate location of the mobile computing device in Block S140, to define a geographic area of interest, and to access or retrieve select data representing generally immutable objects, surfaces, and/or text, etc. within this geographic area of interest in Block S150.

7. Feature Comparison

Block S130 of the method S100 recites identifying a set of image features in the photographic image; Block S160 of the method S100 recites scanning a set of known features for correspondence to image features in the set of image features, wherein the set of known features is associated with geographic locations within a threshold distance of the approximate location. Generally, in Block S130, the native application (or the remote computer system) detects a set of image features in optical data collected in Block S120. The native application (or the remote computer system) then: matches (e.g., detects strong correlation between) the set of image features to a set of known, geo-referenced features in Block S160; and interpolates, triangulates, or otherwise calculates an actual location of the mobile computing device—and therefore the user—in Block S170 based on relative positions and sizes of these image features and locations associated with known features matched to these image features, as shown in FIGS. 2 and 3.

7.1 Static Image

In one implementation, the native application selects a particular optical image recorded in Block S120 and then implements computer vision techniques—such as optical character recognition, feature extraction, object or pattern recognition, deep learning, etc.—to identify one or more features in the optical image in Block S130. For example, if the user is occupying an outdoor space, the native application can identify: a building name, a building number, a building feature (e.g., a window, a door), a light post, a silhouette of a building in the background, an edge of a sidewalk, a fire hydrant, a tree, a street sign, an edge of a building, and/or a traffic sign, etc. in the optical image, as shown in FIG. 1. In another example, if the user is occupying an indoor space, the native application can identify: a window, a door, floor and ceiling corners, a floor pattern, floor and wall colors, a lighting element, a stairwell, an elevator, an office space, and/or an architectural detail (e.g., a stair railing, an interior columns), etc. in the optical image. In Block S130, the native application can thus detect a constellation of features that represent a space occupied by the mobile computing device at a time that the image was recorded.

The native application can then: retrieve a group of known features labeled with geographic locations (or addresses, building names, intersections, green spaces, etc.) contained within a threshold distance of the geographic location indicated by the geospatial location sensor in the mobile computing device, as described above; implement computer vision techniques—such as pattern matching or template matching—to match image features extracted from the optical image to these known features; identify a cluster of matches between these image features and known features; calculate a transform that projects the cluster of known features onto corresponding image features in the static image; and then apply the transform to geographic locations associated with these known features to calculate a geographic location of the mobile computing device at the time the static image was recorded.

7.2 Video

In another implementation, the native application: compiles optical images extracted from a color video recoded by the mobile computing device in Block S120 into a three-dimensional model of a space occupied by the mobile computing device based on detected motion (e.g., a change in position and orientation) of the mobile computing device during recordation of the color video; and then extracts a set of image features from this three-dimensional model of the space.

For example, the native application can implement structure from motion techniques to estimate a three-dimensional structure of a space around the mobile computing device from: a sequence of two-dimensional images (i.e., a video feed) recorded by the mobile computing device; and positions and/or orientations of the mobile computing device during recordation of these two-dimensional images. In this example, the native application can record a video feed: over a period of ten seconds after the native application is opened; once the user has entered a request for a ride and until the user returns the mobile computing device to a pocket or bag up to a duration of 30 seconds; while the native application is open and while the mobile computing device is held with its integrated rear-facing camera at less than 45 degrees from horizontal; or between any other trigger events. The native application can then: stitch frames in this video feed into a single 3D image, such as based on changes in the position of the mobile computing device interpolated from outputs of an accelerometer and/or gyroscope integrated into the mobile computing device; extract a constellation of image features from this 3D image; and then implement methods and techniques described herein to match the constellation of image features in this single 3D image to known, geo-referenced features represented in the localization map.

7.3 Example: Text String Matching

In one example implementation, the native application implements optical character recognition techniques to extract a set of alphanumeric character sequences from the optical image (or video feed) in Block S130, such as test strings from: street signs; street numbers; exterior building signage; building names; logos; advertisements; branding content; and/or other text and symbols. In Block S140, the autonomous vehicle can access a localization map that is labeled with known text strings representing street signs, street numbers, and exterior building signage, etc. within the geographic region of interest, wherein each known text string in the localization map is associated with a geographic location. In Block S150, the native application can then: access a localization map including a set of known text strings, wherein each known text string is associated with a geographic location that the known text string is known to occupy in real space; and scan the localization map for known text strings that contain alphanumeric character sequences detected in the optical image. In particular, the native application can: extract an incomplete alphanumeric character sequence from the optical image (or video feed)—such as due to obfuscation of the remainder of the text string in real space from the field of view of the camera in the mobile computing device at the time the image was recorded—in Block S120; identify each known text string—associated with a location within the geographic region of interest defined in Block S140—that includes at least all alphanumeric symbols in the incomplete alphanumeric character sequence; and repeat this process for each other complete or incomplete alphanumeric character sequence detected in the optical image, thereby amassing a corpus of known, geo-referenced text strings that contain alphanumeric character sequences detected in the optical image.

In Block S170, the native application can then: identify a first cluster of geographically-neighboring known text strings containing a first subset of the alphanumeric character sequences detected in the optical image; identify a second cluster of geographically-neighboring known text strings containing a second subset of the alphanumeric character sequences detected in the optical image; etc. The native application can then localize the mobile computing device to the first cluster if a size of the first cluster exceeds sizes of all other clusters of geographically-neighboring known text strings thus calculated, such as weighted for lengths of alphanumeric character sequences from the image matched to known text strings in these clusters. The native application can then extrapolate the actual geographic location of the mobile computing device based on relative positions of alphanumeric character sequences detected in the image and geographic locations associated with corresponding known text strings in the first cluster, such as described below.

7.4 Example: Surface and Edge Features

In another example implementation, the native application implements computer vision techniques to: extract a set of image edge features detected in the optical image in Block S130; and to predict that the mobile computing device is occupying an interest space based on lighting conditions and/or features types, etc. detected in the image. According, in Block S150, the native application can then: access a localization map containing groups of known edge features that represent interior spaces of buildings within a geographic region, wherein each group of known edge features within the localization map is associated with a discrete building within the geographic region; and scan the localization map for a group of known edge features that exhibit correspondence to geometries and relative positions of the set of image edge features detected in the optical image. In Block S160, the native application can then locate the mobile computing device to a particular building in the geographic region in response to detecting correspondence between the set of image edge features and a first group of known edge features that represent an interior of and are associated with the particular building in the localization map.

Furthermore, in Block S160, the native application can locate the mobile computing device to a particular interior space within the particular building in response to detecting correspondence between the set of image edge features and the first group of known edge features that represent and are associated with the particular interior space within the particular building in the localization map.

In this example implementation, the native application can then: select a particular known access point—in a set of known access points associated with the particular building—nearest the particular interior space or otherwise accessible to the user given the user's current location in the building; dispatch the autonomous vehicle to a particular street location proximal the particular known access point; and serve a notification to the user through the mobile computing device to meet the autonomous vehicle proximal the particular known access point.

7.5 Confidence Score

In the foregoing implementations, the native application can calculate a confidence score that the geographic location associated with a cluster of matched known features corresponds to the actual location of the user's device, such as by calculating a confidence score: as a function of (e.g., proportional to) a number of unique matches between image and known features; as a function of (e.g., inversely proportional to) relative distances between two image features in the optical image and geographic distances between corresponding known features; as a function of (e.g., proportional to) a degree of similarity between an image feature extracted from the optical image and a known feature matched to the image feature; and/or as a function of (e.g., proportional to) a degree of similarity of relative distances between nearby features extracted from the optical image and relative distances between nearby features represented in the map of the geographic area. In an instance in which the native application identifies multiple unique clusters of matched features, the native application can assign a particular geographic location corresponding to a matched feature cluster exhibiting a greatest confidence score.

For example, when the user is occupying an interior space, the native application can retrieve a unique set of features associated with a building at a known address, associated with a wing of a building, with an exit at a known location along a street, or associated with an exit at a known location along a street, etc. The native application can then calculate a confidence score that the user is occupying a particular building or particular wing of a building or that a particular building exit is nearest the user based on a proportion of image features extracted from the optical image that match a set of known features associated with this building, building wing, or building exit, etc. in the localization map. In particular, the native application can determine that the user is occupying a particular building, is occupying a particular building wing, or is nearest a particular building exit associated with a greatest confidence score of all buildings, building wings, or building exits for which known features were compared to image features extracted from the optical image.

In a similar example, the native application can: retrieve a set of features for each address or unique outdoor location within a geographic area constraining the approximate (e.g., GPS-based) geographic location of the user's mobile computing device; calculate a confidence score that the user is standing near a building at a particular address or is occupying a particular outdoor location based on a proportion of image features extracted from the optical image that match a set of known features associated with this address or unique location in the localization map; repeat this process across a set of buildings or outdoor locations represented in the localization map. The native application can then determine that the user is standing in a building or at a particular outdoor location associated with a greatest confidence score.

In another implementation, the native application: retrieves a set of known, geo-referenced features corresponding to a geographic region of interest in Block S150, as described above and shown in FIG. 1; scans these known geo-referenced features across the optical image to identify matches between these known features and features in the optical image in Blocks S130 and S160; identifies a cluster of geographically-neighboring matched features based on geospatial tags assigned to each known feature; and extrapolates an actual location of the mobile computing device from the geographic locations of the known features in this cluster in Block S170.

In yet another implementation, the native application: implements methods and techniques described above to identify image features in the optical image in Block S130; labels each image feature with a type (e.g., building, door, window, building number, tree, lamppost, telephone pole, sidewalk, curb, street, street sign, traffic sign, traffic signal, intersection, etc.); and calculates relative distances between these features, as shown in FIG. 1. The native application then: scans a localization map (e.g., a 3D color point cloud, or a set of template images or template feature constellations) for a similar set of feature types in similar relative positions; and calculates a confidence score that a location within the localization map represents the location of the user's mobile computing device based on similarities in feature types and relative distances between features around this location in the localization map (or in the template image) and like image features in the optical image. Finally, the native application can select a particular location in the localization map (or associated with a particular template image) for which a greatest confidence score was calculated; and confirm this particular location as corresponding to the user's location if this confidence score exceeds a threshold confidence score in Block S170.

(The native application can also: collect an optical image from both the forward- and rear-facing cameras in the mobile computing device; extract a first set of features from a first optical image recorded by the forward-facing camera; extract a second set of features from a second optical image recorded by the rear-facing camera; compiling the first set of features and the second set of features into a composite set of features; and then implement the foregoing methods and techniques to transform this set of features into an actual location of the mobile computing device.)

However, in the foregoing implementations, if a greatest confidence score in a calculated location of the user's mobile computing device—calculated from features extracted from one or more optical images collected passively while the user is navigating through the native application, as described above—is still less than a preset threshold confidence score, the native application can prompt the user to actively scan her environment with a camera integrated into her phone, as described above, and then repeat the foregoing processes to calculate the user's actual location from these additional optical data. Alternatively, in such instances, the native application can prompt the user to indicate more explicitly the user's current location by entering a specific address or dropping a pin on a map within the native application; and the native application can annotate optical data collected in Block S120 with location data thus explicitly provided by the user and then update the localization map with these annotated optical data, such as described below.

However, the native application can implement any other methods or techniques to match one or more image features—extracted from an optical image recorded by a camera integrated into the mobile computing device—to a known feature associated with a known location in the localization map in Blocks S130, S150, and or S160.

8. Projected Location of the Mobile Computing Device

Block S170 of the method S100 recites, in response to detecting correspondence between a first image feature in the set of image features and a first known feature in the set of known features, calculating an actual geographic location of the mobile computing device based on a first geographic location associated with the first known feature. Generally, in Block S170, the native application interpolates, triangulates, or otherwise calculates an actual location of the mobile computing device—and therefore the user—in Block S170 based on relative positions and sizes of image features detected in an optical image and locations of known features matched to these image features.

In one implementation, the native application: selects a geographic location of a known feature matched to an image feature extracted from an optical image recorded by the mobile computing device, such as a known feature associated with a greatest confidence score or contained within a cluster of features associated with a greatest confidence score; and calculates the location of the user's device by projecting the location of this known feature onto the user's location based on a size and position of the particular feature within the optical image in Block S170.

The native application can also implement similar methods and techniques to triangulate the user's location from locations of multiple known features—matched to a set of image features extracted from the optical image—based on the relative sizes and relative positions of these image features within the optical image. In particular, the native application can implement probabilistic view-based object recognition techniques for 3D localization of rigid objects detected in optical data recorded by the mobile computing device and then localize the mobile computing device within a geographic region based on positions of these rigid objects—represented in the localization map—in the field of view of the mobile computing device. For example, the native application can: detect correspondence between a first image feature and a first known feature defining a first immutable rigid object represented in the localization map; a second image feature extracted from the optical image and a second known feature defining a second immutable rigid object represented in the localization map; and a third image feature extracted from the optical image and a third known feature defining a third immutable rigid object represented in the localization map; etc. The native application can then triangulate the actual geospatial position of the mobile computing device based on: positions of the first image feature, the second feature, and the third image feature in the optical image; geometries of the first image feature, the second image feature, and the third image feature in the optical image; and a first geographic location associated with the first known feature, a second geographic location associated with the second known feature, and a third geographic location associated with the third known feature in the localization map.

In another example, in Block S160, the native application can isolate a group of known features associated with locations in close proximity to one another (i.e., a "geospatial cluster of known features") that exhibit high correspondence to image features extracted from an optical image (or video feed, etc.) recorded by the mobile computing device. The native application can then: calculate a transform that projects the known features in the geospatial cluster onto corresponding image features in the optical image (or video frame, etc.); and apply the transform to geographic locations associated with these known features to calculate an actual 3D geographic location of the mobile computing device—such as including latitude, longitude, orientation (e.g., yaw angle), and/or nearest building address or building entrance—at the time the optical image (or video frame) was recorded.

However, the native application can implement any other method or technique to transform locations of known features—matched to image features detected in optical data collected by the mobile computing device in Block S120—into an actual geographic location of the mobile computing device in real space.

9. Location Update and Convergence

In one variation shown in FIG. 3, the native application can repeat the foregoing methods and techniques to collect additional optical data and to transform these optical data into an actual location of the mobile computing device, such as: until the user confirms the request for pickup by a road vehicle at the native application; the native application reaches convergences for the actual location of the mobile computing device; or a confidence score for the actual location of the mobile computing device exceeds a preset threshold score; etc.

In one implementation, the mobile computing device implements methods and techniques described above to record a first optical image at a first time, extract image features from the first optical image, and to transform these image features into an initial estimate of the location of the mobile computing device. Later, the native application can trigger the mobile computing device to record a second optical image at a second time succeeding the first time; extract a second set of image features from the second optical image in Block S120 and scan the second set of known features for correspondence to image features in the second set of image features in Block S160. In response to detecting correspondence between a second image feature in the second set of image features and a second known feature in the set of known features, the native application can: calculate a revised geographic location of the mobile computing device based on a second geographic location associated with the second known feature; and update a pickup location assigned to the autonomous vehicle according to this revised geographic location of the mobile computing device.

In the foregoing implementation, the native application can repeat this process regularly, such as once per second while the user waits for the autonomous vehicle to arrive, while the mobile computing device is in an unlocked state, and/or until the native application converges on the actual location of the mobile computing device, etc.

In the foregoing implementation (and implementations described below), as the native application collects additional optical data and recalculates the actual location of the mobile computing device, the native application can: re-center the geographic region of interest over the last calculated location of the mobile computing device; and scan a corresponding revised area of the localization map for known features that match features extracted from these additional optical data accordingly. In this variation, the native application can also reduce a size of the geographic region of interest as the native application converges on the actual location of the mobile computing device, such as to reduce processing time and/or total volume of transmitted data as the native application refines the calculated location of the mobile computing device.

However, the native application (and/or the remote computer system) can repeat the foregoing processes to refine the calculated location of the mobile computing device in any other way and in response to any trigger or event.

10. Location Confirmation

In one variation, upon determining the user's location, the native application can illustrate this location within a graphical user interface within the native application and prompt the user to confirm the determined location. For example, the native application can show the determined location within a virtual map, render stock images of an indoor or outdoor space near the determined location within the graphical user interface, and/or present a textual description of known features or artifacts near the user (e.g., by retrieving this textual description from an online encyclopedia), etc. The user can then: review the determined location and confirm her location directly; or review this location-related content and confirm that such features indicated within the graphical user interface are present in her vicinity, thereby indirectly confirming that the determined location is correct.

Upon receipt of manual confirmation of her location from the user at the mobile computing device, the native application and/or the remote computer system can implement supervised machine learning techniques to merge the location confirmed by the user with optical data collected in Block S120 to revise the localization map (or other geo-referenced feature model), as shown in FIG. 3. In particular, once the user confirms her location at the mobile computing device, the native application can associate image features extracted from the optical image (or video feed, etc.) with this user-confirmed location and return these data to the remote computer system. The remote computer system can then: extrapolate a latitude, longitude, and/or orientation of each of these image features based on their relative positions and orientations in the optical image and the user-confirmed location; and further refine and/or update the localization map with these geo-referenced image features.

In one implementation, the native application localizes the mobile computing device to a particular building within a geographic region in Block S170. The native application then: indicates this particular building on a digital map rendered on the display of the mobile computing device; and serves a notification—on the display of the mobile computing device—to confirm occupation of the particular building by the user. For example, the native application can: render a pin at a location on the digital map corresponding to this particular building (or corresponding to a particular room or space inside the particular building) identified in Block S170; and prompt the user to adjust the location of the pin or to confirm the original location of the pin. Upon receipt of confirmation or adjustment of the location of the pin on the digital map from the user, the native application can return optical data and the user's response to the remote computer system; and the remote computer system can update a representation of the interior of the particular building according to the set of image edge features detected in the optical image. In particular, the remote computer system can refine or further develop a model (e.g., a localization map) of interior spaces of buildings within the geographic region based on optical data recorded by mobile computing devices occupying these interior spaces while users request and/or wait for arrival of rideshare vehicles. Later, the remote computer system can cooperate with instances of the native application executing on mobile computing devices within this geographic region: to localize these mobile computing devices with greater confidence based on this refined localization; and to repeat these processes to further refine and develop the localization map over time.

The remote computer system and instances of the native application can implement similar methods and techniques to refine and develop representations of outdoor spaces in the localization map.

In this variation, the remote computer system and the native application can alternatively: label an optical image recorded by the mobile computing device with a location confirmed by the user; and store this geo-referenced optical image as a template image in a template image database. The remote computer system and instances of the native application can later match features in optical images recorded by mobile computing devices executing these native application instances to georeferenced template images in the template image database in Block S160 to determine geographic locations occupied by these mobile computing devices.

Therefore, the remote computer system and instances of the native application can implement supervised machine learning techniques to construct a localization map or other geo-referenced model representing distinguishable features at various locations throughout a geographic location based on optical data collected through mobile computing devices executing these instances of the native application and based on feedback supplied by corresponding users.

11. Vehicle Dispatch

Block S180 of the method S100 recites dispatching an autonomous vehicle to proximal the actual geographic location of the mobile computing device.

In one implementation, once a location of the user is determined in Block S170 (and confirmed by the user) and the user confirms the request for pickup, the native application can push details of the request and the calculated location of the mobile computing device to the remote computer system (or to a remote rideshare dispatcher). The remote computer system (or the remote rideshare dispatcher) can then assign an autonomous vehicle nearby to collect the user at the calculated location in Block S180, as shown in FIG. 2. For example, the remote computer system can identify a street location or other vehicle-accessible road surface proximal the actual geographic location of the mobile computing device and then dispatch the autonomous vehicle to this street location in Block S180. The autonomous vehicle can then interface with an external mapping service to generate a set of directions for navigating to the user's location and autonomously navigate to the user's location accordingly.

In one example in which the native application determines that the user is occupying an outdoor location, the remote computer system (or the native application) can push a determined location of the user's mobile computing device—and therefore a calculated location of the user—to a remote computer system (or directly to the autonomous vehicle) for generation of a set of navigational commands (e.g., a "preplanned path") directing the autonomous vehicle to the user's location. However, if the native application determines that the user is occupying an indoor location, the remote computer system (or the native application) can identify an outdoor location navigable by a road vehicle and nearest or most convenient to the user based on the indoor location of the user's mobile computing device. In this example, the remote computer system can: retrieve a building address for the building occupied by the user; generate a set of navigational commands to direct an autonomous vehicle—assigned to collect the user—to the building address; select an exit door of the building nearest the user; adjust the navigational commands to terminate at the selected exit; and then serve these adjusted navigational commands to the autonomous vehicle.

12. Visual Feedback

In one variation, the native application (or the remote computer system) accesses a video feed from the autonomous vehicle as the autonomous vehicle navigates toward the calculated location of the user and renders this autonomous vehicle video feed on the display of the user's mobile computing device in order to enable the user to observe the autonomous vehicle's surroundings and thus better understand the autonomous vehicle's location in relation to the user.

In one implementation, the native application receives a color video from the autonomous vehicle (e.g., a video feed from a forward-facing color camera integrated into the autonomous vehicle) substantially in real-time and renders the color video on the display of the mobile computing device as the user waits for the autonomous vehicle to arrive at her location. In this implementation, the native application (or the remote computer system) can also scan the color video for features exhibiting correspondence to image features extracted from optical data recorded by the mobile computing device; in response to detecting a feature in the autonomous vehicle color video that exhibits correspondence to an image feature extracted from the optical data, the native application (or the remote computer system) can highlight this feature in the color video rendered on the display of the mobile computing device, thereby visually indicating to the user that objects detected near the user may also be near the autonomous vehicle and that the autonomous vehicle may therefore be proximal the user.

Additionally or alternatively, in response to detecting a feature in the autonomous vehicle color video that exhibits correspondence to an image feature extracted from the optical data, the native application can determine that the autonomous vehicle has reached its assigned destination near the user and thus cease additional collection of optical data at the mobile computing device.

13. Real-Time Updates

As shown in FIG. 3, the native application (and/or the remote computer system) can repeat the foregoing Blocks of the method S100 over time following receipt of an order for pickup at the native application. For example, the native application can: monitor the user's motion through an accelerometer and/or gyroscope integrated into the mobile computing device; prompt the user to record a digital photographic image, a panoramic image, or a video of her surroundings if the native application determines that the user has moved more than five meters from her last position; implement the foregoing methods and techniques to recalculate the user's location based on these new optical data; and then update the destination of the autonomous vehicle accordingly.

In particular, the native application can trigger the mobile computing device to record a second optical image and then transform this second optical image into a revised location of the mobile computing device, such as described above, in response to detecting motion of the user, such as beyond a threshold distance or threshold number of steps away from the mobile computing device location previously calculated. For example, the native application can sample an accelerometer, gyroscope, and/or other motion sensors in the mobile computing device and implement dead reckoning or step counting techniques to track a distance that the user has moved with the mobile computing device since the last location of the mobile computing device was determined from optical data recorded by the mobile computing device. In this example, once this distance exceeds a threshold distance (e.g., five meters or five steps), the native application can trigger collection of new optical data and recalculate the location of the mobile computing device accordingly.

The native application can additionally or alternatively: regularly, passively sample the mobile computing device's camera between receipt of the pickup request from the user and arrival of the autonomous vehicle at the user's calculated location; implement the foregoing methods and techniques to recalculate the user's location based on these new optical data; and then update the pickup location assigned the autonomous vehicle accordingly.

14. User Directions

In the implementation described above in which the native application determines that the user is occupying a building or enclosed outdoor space, the native application can: select an exit at which the autonomous vehicle is to collect the user; and serve to the user navigational instructions—through a graphical user interface within the native application—for walking to this selected exit. The native application can thus serve directions both to the autonomous vehicle and to the user to meet at a rendezvous location selected by the native application (or by the remote computer system).

15. Local v. Remote Processing

As described above, Blocks of the method S100 can be selectively executed by the native application, by the autonomous vehicle, by the remote computer system, and/or by a remote rideshare dispatcher, etc.

For example, the native application—executing on the user's mobile computing device—can locally: receive rideshare request information from the user in Block S110; trigger the mobile computing device to record optical data (e.g., static images, a video feed) in Block S120; extract a set of image features from these optical data in Block S130; query a geographic location module (e.g., a GPS sensor) integrated into the mobile computing device for the approximate location of the mobile computing device in Block S140; and then return the rideshare request information, the set of image features (rather than the static images or complete video feed), and the approximate location to the remote computer system, such as via a cellular or Wi-Fi network. The remote computer system can then remotely: scan the localization map for known features that exhibit correspondence to image features received from the native application in Block S160; and calculate the actual location of the mobile computing device accordingly in Block S170. The remote computer system (or the remote rideshare dispatcher) can then: queue an autonomous vehicle to autonomously navigate to proximal the actual geographic location of the mobile computing device—and therefore the user—in Block S180; and return to the native application confirmation that the autonomous vehicle was dispatched to the user's location.

In another example, once an autonomous vehicle is assigned to the user, the native application can cooperate with the autonomous vehicle to regularly collect additional optical data and to recalculate the user's location. In this example, the native application can record optical data and then transmit features extracted from optical data or transmit the original optical data (e.g., static images, a video feed) to the autonomous vehicle that has been assigned to collect the user. The autonomous vehicle can then process these features or the original optical data to estimate the user's location and update its own destination accordingly, as described above.

However, the native application, the autonomous vehicle, the remote computer system, and/or a remote rideshare dispatcher, etc. can execute any Blocks of the method locally or remotely.

16. Drop-Off and Other Applications

In one variation, a second instance of the native application executing on a second mobile computing device associated with a friend, family member, coworker, or other acquaintance of the user can implement similar methods and techniques to determine the location of this acquaintance and to adjust a destination of the autonomous vehicle—transporting the user—accordingly.

Furthermore, the native application and the remote computer system can implement similar methods and techniques: to determine the location of a user who owns, leases, or rents an autonomous vehicle; and to dispatch the user's autonomous vehicle to her calculated location.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, a cloud server, or any other suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for localizing a user, the method comprising:
   receiving a request for pickup of the user by a road vehicle, the request captured with a mobile computing device;
   accessing a set of optical features of a distinguishing immutable object in a scene near the user scanned by the mobile computing device at a first time, the set of optical features accessed in connection with a notification served to the user through the mobile computing device to manually scan the distinguishing immutable object in the scene near the user in response to receiving the request for pickup of the user;
   detecting a set of image features represented by the set of optical features of the distinguishing immutable object;
   accessing an approximate location of the mobile computing device from a geospatial positioning system;
   scanning a set of known features for correspondence to one or more image features in the set of image features, the set of known features associated with one or more geographic locations within a threshold distance of the approximate location;
   in response to detecting correspondence between a first image feature in the set of image features and a first known feature in the set of known features, calculating an actual geographic location of the mobile computing device based on a first geographic location associated with the first known feature; and
   dispatching an autonomous vehicle to a pickup location proximal the actual geographic location.

2. The method of claim 1, wherein dispatching the autonomous vehicle to the pickup location proximal the actual geographic location comprises assigning a street location proximal the actual geographic location.

3. The method of claim 2, wherein a video is recorded with the mobile computing device in response to initiation of a rideshare application on the mobile computing device, a set of optical images extracted from the video being compiled into a three-dimensional model of a space occupied by the mobile computing device based on detected motion of the mobile computing device during recordation of the video, the set of image features being extracted from the three-dimensional model.

4. The method of claim 1, further comprising:
   detecting a second set of image features obtained at a second time succeeding the first time;
   receiving an optical data stream from the autonomous vehicle; and
   confirming proximity of the autonomous vehicle to the mobile computing device by scanning the optical data stream for one or more features exhibiting correspondence to the second set of image features.

5. The method of claim 1, wherein the set of optical features is included in a photographic image.

6. The method of claim 1, wherein detecting the set of image features represented by the set of optical features comprises extracting a set of alphanumeric character sequences from the set optical features, the method further comprising:
   accessing a localization map comprising a set of known text strings, each known text string in the set of known text strings associated with a geographic location that the known text string is known to occupy in real space; and
   scanning the localization map for at least one known text string in the set of known text strings that contains one or more alphanumeric character sequences in the set of alphanumeric character sequences;
   identifying a first cluster of geographically-neighboring known text strings containing a first subset of the set of alphanumeric character sequences;
   identifying a second cluster of geographically-neighboring known text strings containing a second subset of the set of alphanumeric character sequences; and
   in response to a first size of the first cluster of geographically-neighboring known text strings exceeding a second size of the second cluster of geographically-neighboring known text strings, extrapolating the actual geographic location of the mobile computing device based on relative positions of the first subset of the set of alphanumeric character sequences and geographic locations associated with the first cluster of geographically-neighboring known text strings.

7. The method of claim 6, wherein accessing the localization map comprises accessing the localization map labeled with known text strings representing one or more of street signs, street numbers, and exterior building signage within a geographic region, each of the set of known text strings associated with a geographic location in the localization map.

8. The method of claim 1, wherein calculating the actual geographic location of the mobile computing device comprises localizing the mobile computing device to a particular building in the geographic region in response to detecting correspondence between a group of known edge features in a localization map and a set of image edge features detected in the set of optical features, the group of known edge features associated with the particular building, the autonomous vehicle being dispatched to the particular building, the autonomous vehicle being dispatched to a particular street location proximal to a particular known access point associated with the particular building as the pickup location when the actual geographic location includes a particular interior space.

9. The method of claim 8, further comprising:
indicating the particular building on a map rendered on a display of the mobile computing device;
serving a notification on the display of the mobile computing device to confirm occupation of the particular building by the user; and
in response to receipt of confirmation from the user, updating a representation of an interior of the particular building according to the set of image edge features.

10. The method of claim 1, further comprising:
receiving a video from the autonomous vehicle;
rendering the video on a display of the mobile computing device;
scanning the video for features exhibiting correspondence to image features in the set of image features; and
in response to detecting a feature in the video exhibiting correspondence to an image feature in the set of image features, highlighting the feature in the video rendered on the display of the mobile computing device.

11. The method of claim 1, wherein scanning the set of known features for correspondence to the one or more image features in the set of image features comprises:
accessing a localization map comprising a corpus of known features representing a geographic region;
defining a subregion, within the geographic region, containing the approximate location and extending radially from the approximate location by the threshold distance; and
scanning an area of the localization map corresponding to the subregion for any known features in the set of known features corresponding to the set of image features; and
wherein calculating the actual geographic location of the mobile computing device comprises, in response to detecting correspondence between the first image feature and the first known feature, a second image feature and a second known feature, and a third image feature and a third known feature, triangulating the actual geographic position of the mobile computing device based on:
positions of the first image feature, the second feature, and the third image feature in the set of optical features;
geometries of the first image feature, the second image feature, and the third image feature in the set of optical features; and
the first geographic location associated with the first known feature, a second geographic location associated with the second known feature, and a third geographic location associated with the third known feature in the localization map.

12. The method of claim 1, wherein the set of optical features includes a pattern or sequence.

13. A method for determining a location of a user, the method comprising:
receiving a request for pickup of the user by a road vehicle, the request captured with a mobile computing device;
accessing a set of optical features of a distinguishing immutable object in a scene near the user scanned by the mobile computing device at a first time, the set of optical features accessed in connection with a notification served to the user through the mobile computing device to manually scan the distinguishing immutable object in the scene near the user in response to receiving the request for pickup of the user;
detecting a set of image features represented by the set of optical features of the distinguishing immutable object;
accessing an approximate location of the mobile computing device from a geospatial positioning system;
accessing a set of known features associated with one or more geographic locations within a threshold distance of the approximate location;
in response to detecting correspondence between a first image feature in the set of image features and a first known feature in the set of known features, extrapolating an actual geographic location of the mobile computing device based on a particular geographic location associated with the particular known feature; and
dispatching an autonomous vehicle to a pickup location proximal the actual geographic location.

14. The method of claim 13, wherein accessing the set of known features comprises:
accessing a localization map representing surfaces within a geographic region;
defining a subregion, within the geographic region, containing the approximate location and extending radially from the approximate location by the threshold distance; and
scanning an area of the localization map corresponding to the subregion for one or more known features corresponding to the set of image features.

15. The method of claim 13, wherein the set of optical features includes a pattern or sequence.

16. One or more tangible non-transitory computer-readable storage media storing computer-executable instructions for performing a computer process on a computing system, the computer process comprising:
receiving a request for pickup of a user by a road vehicle, the request captured with a mobile computing device;
accessing a set of optical features of a distinguishing immutable object in a scene near the user scanned by the mobile computing device at a first time, the set of optical features accessed in connection with a notification served to the user through the mobile computing device to manually scan the distinguishing immutable object in the scene near the user in response to receiving the request for pickup of the user;
detecting a set of image features represented by the set of optical features of the distinguishing immutable object;
accessing an approximate location of the mobile computing device from a geospatial positioning system;
scanning a set of known features for correspondence to one or more image features in the set of image features, the set of known features associated with one or more geographic locations within a threshold distance of the approximate location;
in response to detecting correspondence between a first image feature in the set of image features and a first known feature in the set of known features, calculating an actual geographic location of the mobile computing device based on a first geographic location associated with the first known feature; and
dispatching an autonomous vehicle to a pickup location proximal the actual geographic location.

17. The one or more tangible non-transitory computer-readable storage media of claim 16, wherein accessing the set of known features comprises:
- accessing a localization map representing surfaces within a geographic region;
- defining a subregion, within the geographic region, containing the approximate location and extending radially from the approximate location by the threshold distance; and
- scanning an area of the localization map corresponding to the subregion for one or more known features corresponding to the set of image features.

18. The one or more tangible non-transitory computer-readable storage media of claim 16, wherein the set of optical features includes a pattern or sequence.

19. The one or more tangible non-transitory computer-readable storage media of claim 16, wherein the set of optical features includes a pattern or sequence.

* * * * *